(12) United States Patent
Bagga et al.

(10) Patent No.: US 10,437,711 B1
(45) Date of Patent: Oct. 8, 2019

(54) FRAMEWORK FOR FAULT TOLERANT CASE CREATION

(71) Applicant: Bank of America Corporation, Charlotte, NC (US)

(72) Inventors: Charanjit Bagga, Thousand Oaks, CA (US); Saurabh Dixit, Plano, TX (US); Narayana Mukkamalla, Lewisville, TX (US); Muralidhar Chowdarapu, Simi Valley, CA (US); Dasu Maddukuri, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 29 days.

(21) Appl. No.: 15/926,515

(22) Filed: Mar. 20, 2018

(51) Int. Cl.
*G06F 9/44* (2018.01)
*G06F 11/36* (2006.01)

(52) U.S. Cl.
CPC ...... *G06F 11/3684* (2013.01); *G06F 11/3688* (2013.01); *G06F 11/3692* (2013.01); *G06F 11/3696* (2013.01)

(58) Field of Classification Search
None
See application file for complete search history.

(56) References Cited

U.S. PATENT DOCUMENTS

| | | |
|---|---|---|
| 5,548,506 A | 8/1996 | Srinivasan |
| 5,627,979 A | 5/1997 | Chang et al. |
| 5,826,250 A | 10/1998 | Trefler |
| 6,208,720 B1 | 3/2001 | Curtis et al. |
| 6,310,951 B1 | 10/2001 | Wineberg et al. |
| 6,556,985 B1 | 4/2003 | Karch |
| 6,606,740 B1 | 8/2003 | Lynn et al. |
| 7,865,875 B2 * | 1/2011 | Hockenberry ....... G06Q 10/103 717/101 |
| 9,606,903 B2 | 3/2017 | Murugesan |
| 2003/0004770 A1 | 1/2003 | Miller et al. |
| 2003/0004771 A1 | 1/2003 | Yaung |
| 2004/0039718 A1 | 2/2004 | Lumpp et al. |
| 2005/0086579 A1 | 4/2005 | Leitner et al. |
| 2005/0096959 A1 | 5/2005 | Kumar et al. |
| 2008/0127101 A1 | 5/2008 | Anafi et al. |
| 2013/0231970 A1 | 9/2013 | Trefler et al. |
| 2015/0356001 A1 | 12/2015 | Murugesan |
| 2016/0098298 A1* | 4/2016 | Trefler .................. G06F 9/4881 718/104 |
| 2016/0224354 A1 | 8/2016 | Garrard et al. |
| 2016/0224909 A1 | 8/2016 | Garrard et al. |

* cited by examiner

*Primary Examiner* — Qamrun Nahar
(74) *Attorney, Agent, or Firm* — Michael A. Springs; Moore & Van Allen PLLC; Nicholas C. Russell

(57) ABSTRACT

Embodiments of the present invention provide a system for fault tolerant case creation. The system is typically configured for receiving an application specific input associated with an application from a user via a user portal, storing the application specific input in a repository, accessing the repository to determine a plurality of predefined triggering parameters, identifying occurrence of first external event, creating an instance of the first external event, adding the first external event and the associated instance in a queue as a first entry, de-queuing the first entry, invoking one or more codes for creating a first case for the first external event and the associated instance, identifying that the creation of the first case by the one or more codes is successful, and generating a report comprising information associated with the successful creation of the first case.

20 Claims, 6 Drawing Sheets

1

FRAMEWORK FOR FAULT TOLERANT CASE CREATION

FIELD

The present invention relates to creating cases associated with multiple applications effectively for various external events triggered within an entity.

BACKGROUND

Creating Cases associated with multiple applications (in a Case Management System) is a non-trivial time consuming process. Typically, a developer has to develop a code for explicitly creating each case. Additionally, in conventional Case Management Systems, developers have to monitor the progress of each Case creation, track errors, and take appropriate remedial actions. Thus, there is a need for technical improvements to the case creation process.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for fault tolerant case creation. The invention receives an application specific input from at least one first user, via a user portal, associated with at least one first application, wherein the application specific input comprises at least case properties, case intake information, and a plurality of predefined triggering parameters, each of which indicates a need for a case to be created; stores the application specific input received from the at least one first user in a repository; accesses the repository to determine at least one of the plurality of predefined triggering parameters; identifies occurrence of at least one first event associated with the at least one first application; in response to identifying occurrence of the at least one first event, extracts the case properties and the case intake information associated with the at least one first application from the repository; creates an instance of the at least one first event based on the case intake information; adds the at least one first event and the associated instance of the at least one first event in a queue as a first entry; de-queues the first entry; and invokes one or more codes associated with the first external event for creating a first case for the first external event and the associated instance, wherein the one or more codes are associated with the at least one first application.

In some embodiments, the invention identifies that the creation of the first case by the one or more codes is successful and generates a report comprising information associated with the successful creation of the first case.

In some embodiments, the invention identifies that the creation of the first case by the one or more codes is not successful; identifies a retry count associated with the creation of the first case from the case properties associated with the at least one first application; identifies that the retry count is greater than zero; retries the creation of the first case based on identifying that the retry count is greater than zero; updates a current case creation count associated with the creation of the first case, wherein the updating comprises increasing the current case creation count by one; and generates a report associated with the creation of the first case, wherein the report comprises at least the retry count and the current case creation count.

In some embodiments, the invention in response to retrying the creation of the first case, identifies that the retry is not successful; determines that the current case creation count is less than or equal to the retry count; retries the creation of the first case based on determining that the current case creation count is less than the retry count; and updates the current case creation count in the report.

In some embodiments, the invention identifies that the retry in not successful; determines that the current case creation count is more than the retry count; and notifies the at least one first user and display the report to the at least one first user via the user portal.

In some embodiments, the invention receives one or more remediation steps from the at least one first user, wherein the one or more remediation steps are associated with the creation of the first case.

In some embodiments, the invention in response to notifying the at least one first user, receives an input from the at least one first user to retry the creation of the first case; and retries the creation of the first case based on receiving the input from the at least one first user.

In some embodiments, the invention in response to identifying that the creation of the first case is not successful, identifies error information associated with the creation of the first case; and updates the report with the identified error information.

In some embodiments, the invention identifies that that the creation of the first case by the one or more codes is not successful by at least determining that the instance with the first case intake information does not comprise all inputs for the case intake information associated with the application specific input.

In some embodiments, the invention identifies that the retry count is equal to zero; and notifies the at least one user and display the report to the at least one user via the user portal.

In some embodiments, the invention identifies occurrence of the at least one first event by identifying a trigger based on at least one of an email received in a mail box, a document received via fax, an interaction with an interactive voice response system, and a text message received in a message folder.

In some embodiments, the invention identifies occurrence of the at least one first event based on receiving an internal event input from the at least one first user associated with an external triggering event.

In some embodiments, the invention identifies occurrence of a second external event associated with a second application, in response to identifying occurrence of the second external event, extracts the case properties and the case intake information associated with the second external event from the repository, creates a second instance of the second external event based on the case intake information, adds the second external event and the associated second instance of the second external event in the queue as a second entry, de-queues the second entry, and invokes second set of one or more codes associated with the second external event for creating a second case for the second external event and the associated second instance, wherein the second set of one or more codes are associated with the second application.

In some embodiments, the invention identifies occurrence of the at least one first event by monitoring a plurality of external systems for occurrence of one or more triggering events corresponding to at least one of the predefined triggering parameters associated with at least one first application; wherein identifying comprises identifying, by the monitoring, occurrence of at least one first event associated with the at least one first application.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
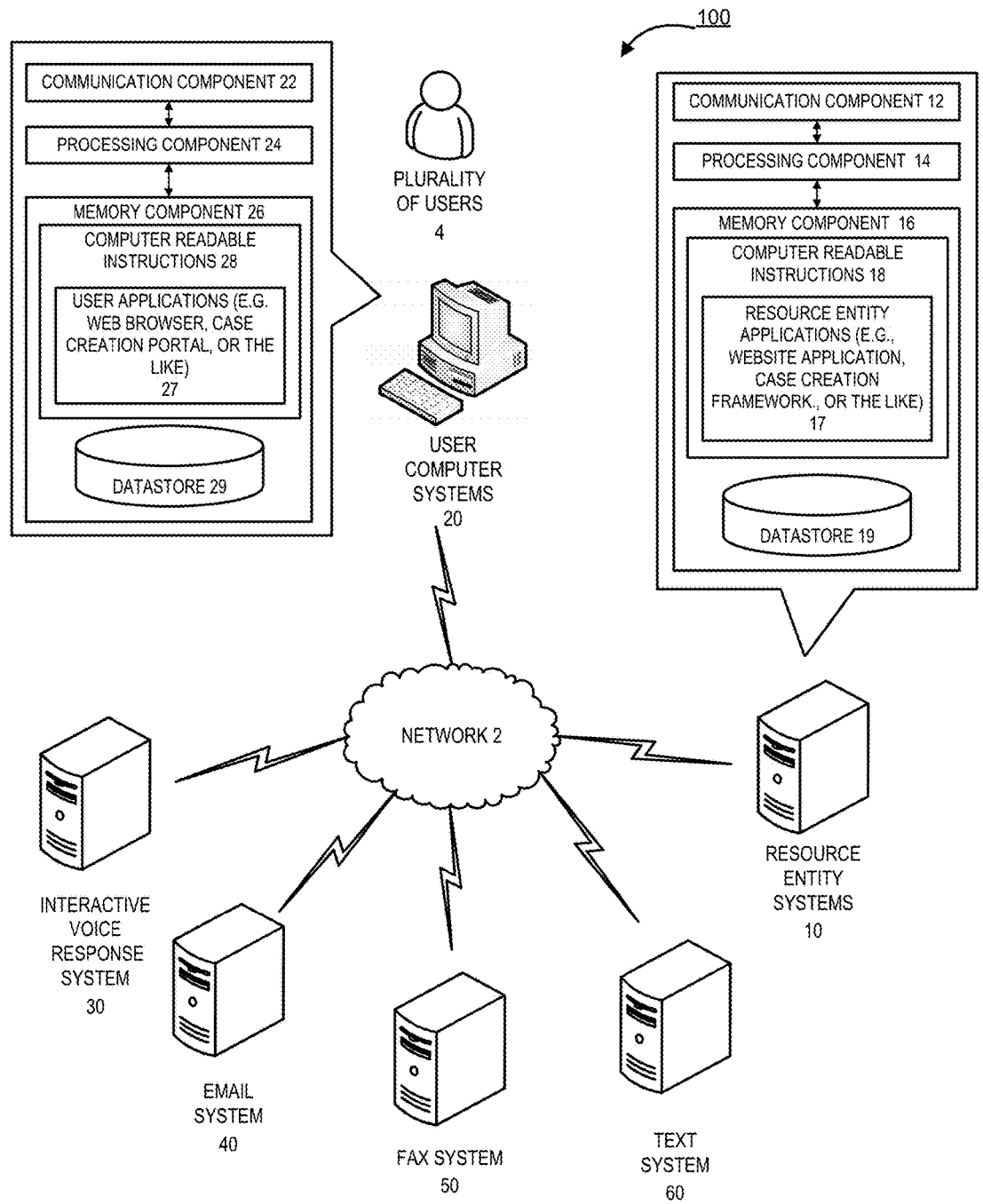

Having thus described embodiments of the invention in general terms, reference will now be made to the accompanying drawings, where:

FIG. 1 illustrates a block diagram illustrating a system environment for fault tolerant case creation, in accordance with embodiments of the present invention.

Figure 2A:
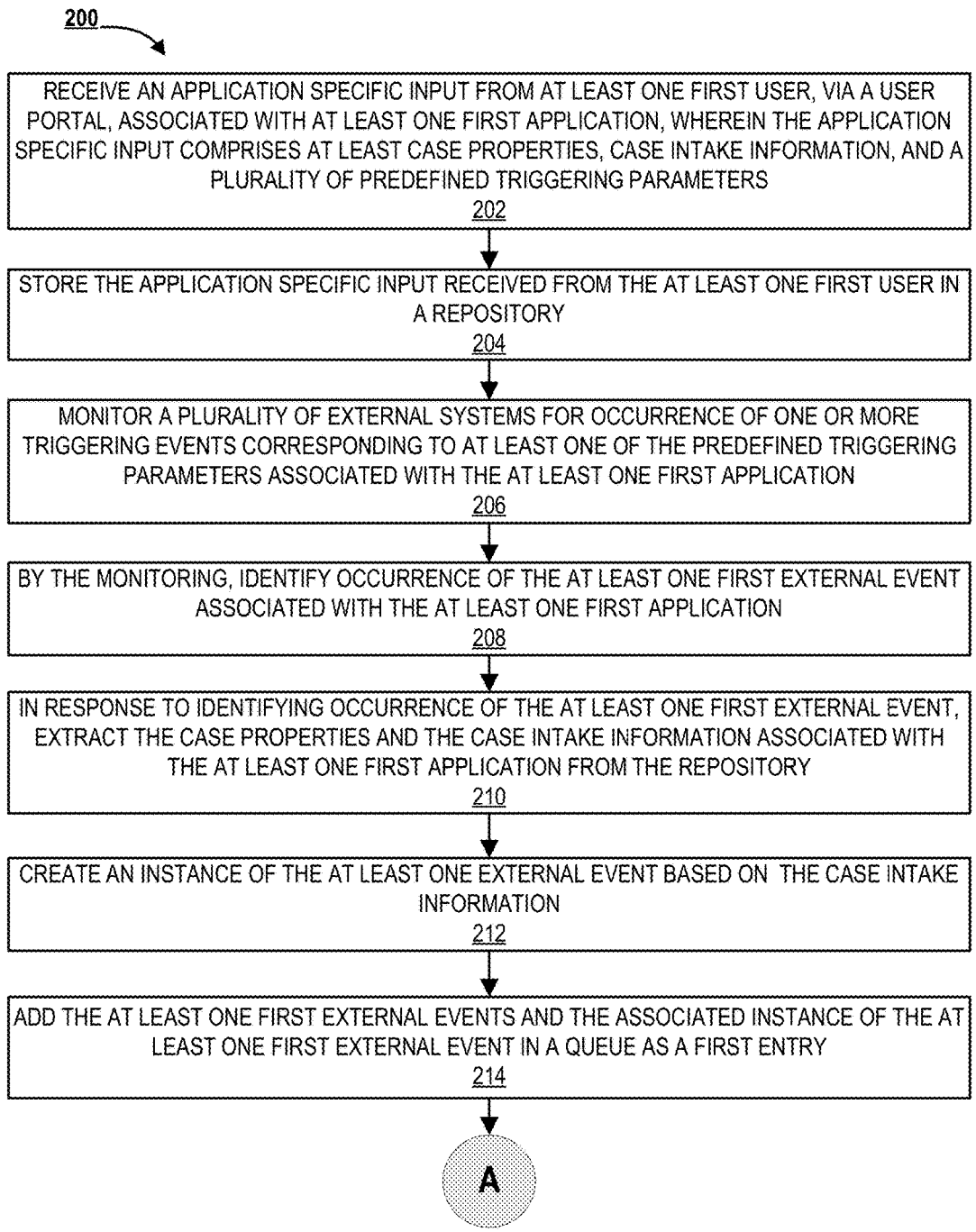

FIG. 2A is a flowchart illustrating a general process flow for automatically creating cases associated with multiple applications for externally triggered events, in accordance with embodiments of the present invention.

Figure 2B:
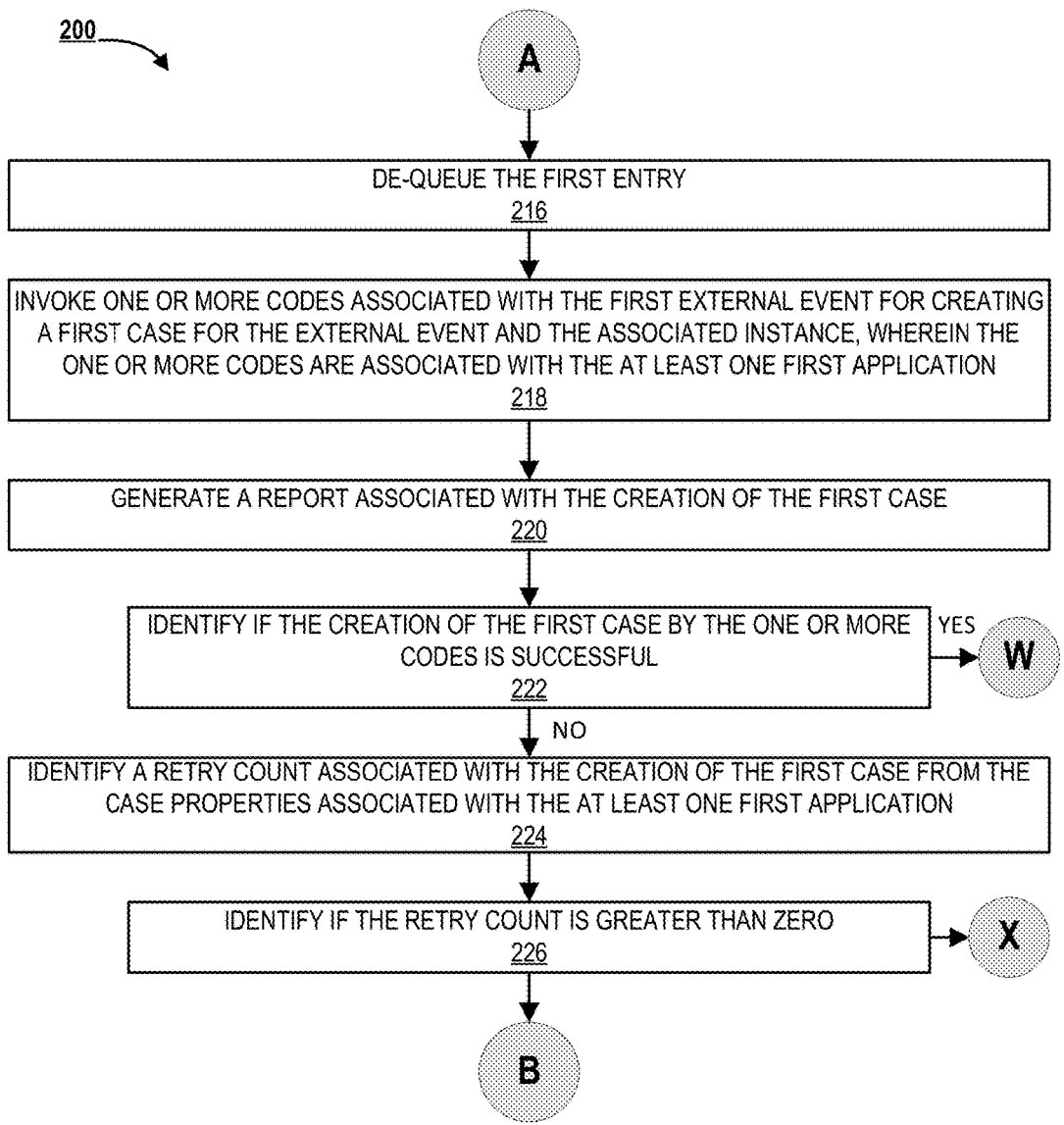

FIG. 2B is a flowchart illustrating a continuation of the general process flow for automatically creating cases associated with multiple applications for externally triggered events, in accordance with embodiments of the present invention.

Figure 2C:
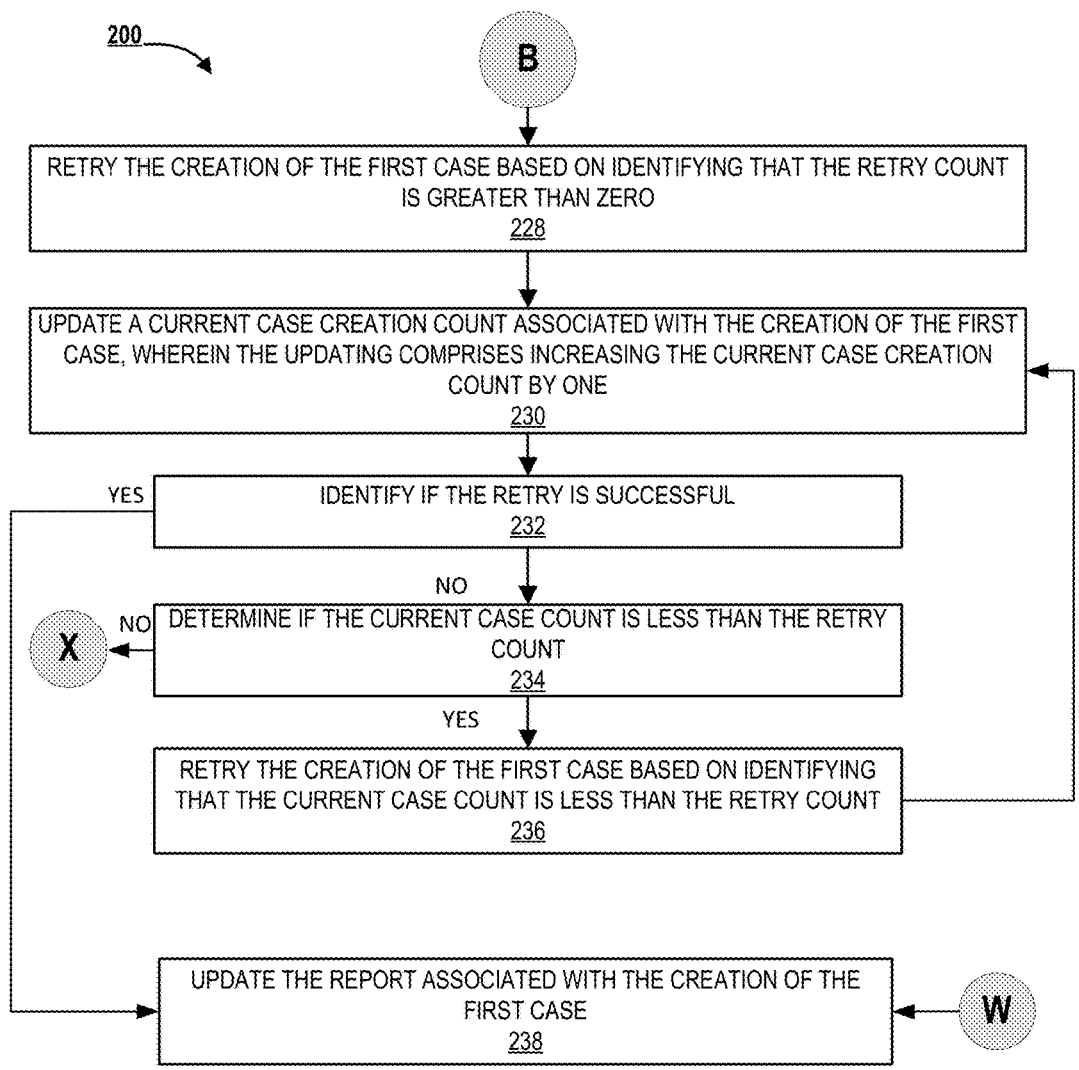

FIG. 2C is a flowchart illustrating a continuation of the general process flow for automatically creating cases associated with multiple applications for externally triggered events, in accordance with embodiments of the present invention.

Figure 2D:
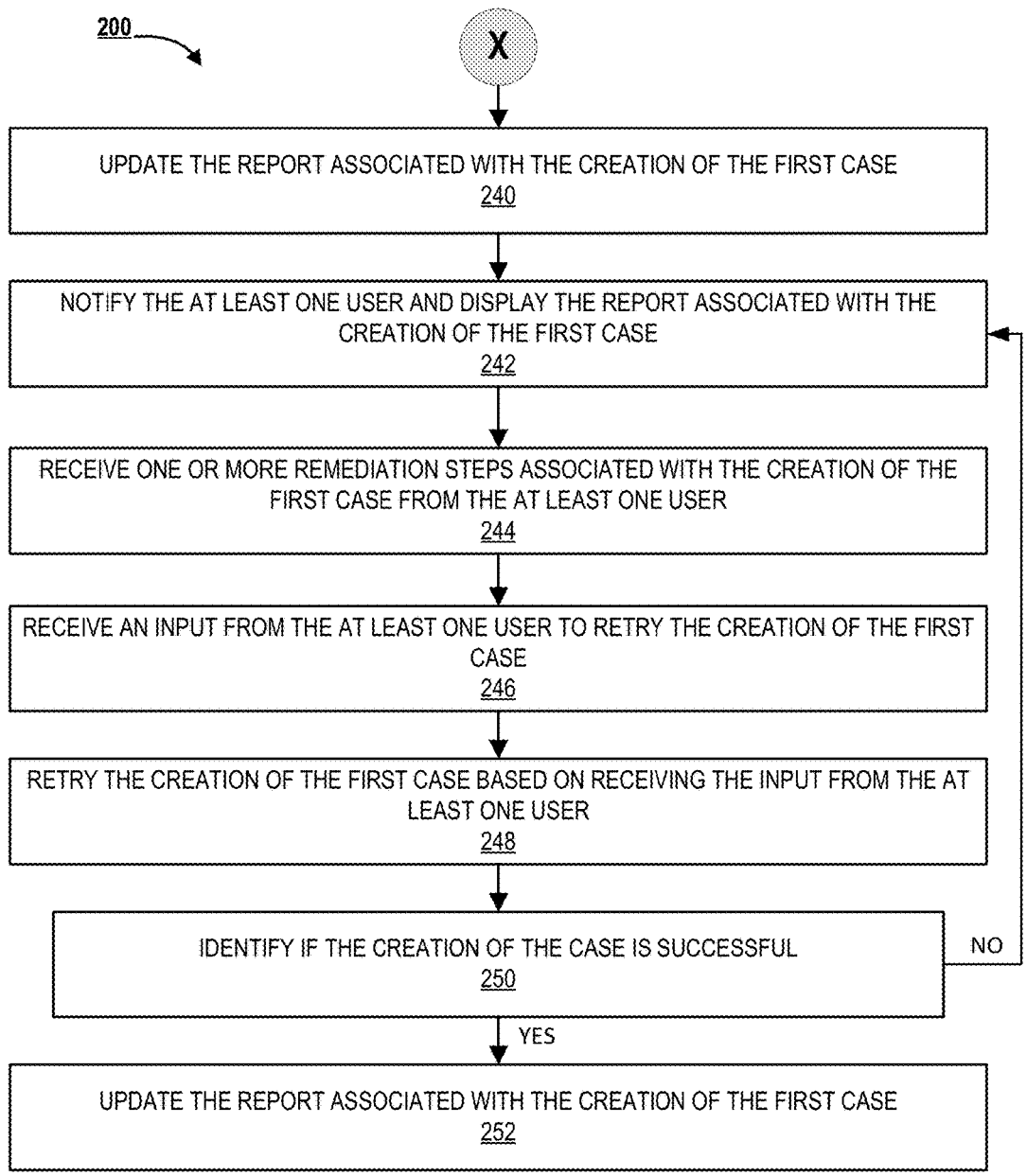

FIG. 2D is a flowchart illustrating a continuation of the general process flow for automatically creating cases associated with multiple applications for externally triggered events, in accordance with embodiments of the present invention.

Figure 3:
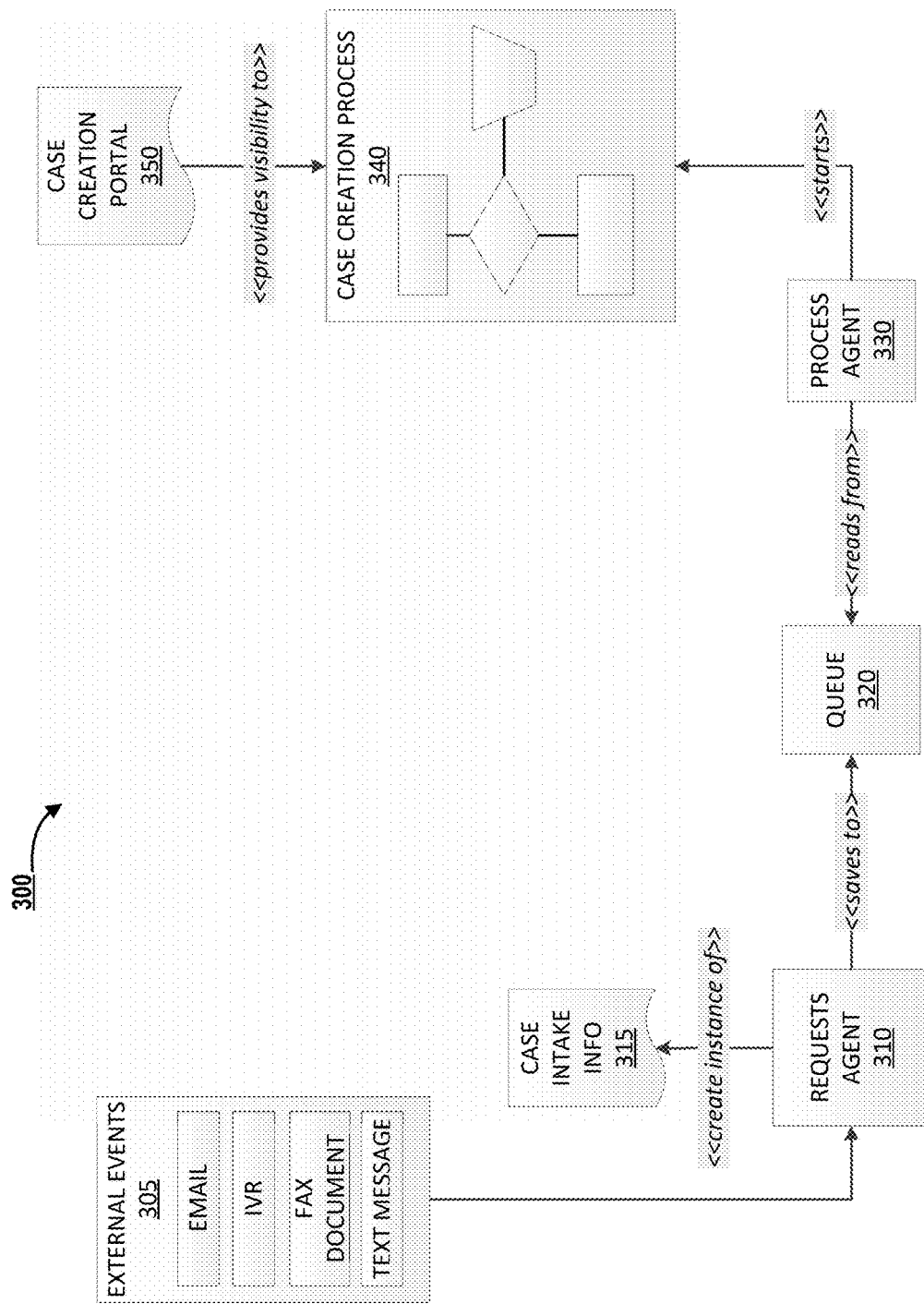

FIG. 3 is a block diagram illustrating multiple blocks in a fault tolerant case creation framework, in accordance with embodiments of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Today there are many steps application developers must complete to effectively create cases associated with multiple applications used within an entity. There is a need for developing and deploying a framework for automating and simplifying the process. An example of supporting creation of such a framework is the Pega® Platform, which is provided by Pegasystems Inc. of Boston, Mass. It provides for an adaptive, cloud-architected software that empowers people to rapidly deploy, and easily extend and change application to meet strategic business needs, providing capabilities in content and resource management and business process management (BPM). The current invention leverages capabilities of the Pega® Platform to create cases for externally triggered events associated with multiple applications within an entity.

Systems, methods, and computer program products are herein disclosed that provide for creating cases associated with multiple applications used within an entity. Typically, the conventional process for creating cases associated with multiple applications within an entity requires a developer to create a code manually and explicitly feed inputs to the developed code. However, there may be multiple applications within an entity and each of the applications may have a large number of incoming cases on a daily basis for multiple externally triggered events. This process of manually creating large number of cases is prone to human errors, thereby decreasing the efficiency of the process. Some conventional systems associated with case creation may typically create cases automatically without requiring a developer to develop a code for each of the externally triggered events, but do not effectively monitor creation of cases. For example, based on an external event, a conventional system may create a case, but if the case creation encounters an error, then the system typically aborts the process and does not provide any tracking or error information associated with such failed cases. Upon encountering an error, the conventional systems do not have the capability to effectively retry creating the case and follow through on the case. Although the current conventional systems may not require a developer to develop a code at a case level for each of the cases associated with one application, they may require a developer to develop a code at an application level for each of the multiple applications to create application specific cases related to each of those applications. In other words, conventional systems may not require inputs to create cases related to one application (such as a loan application), but they may require a developer to develop a code for each of multiple applications (such as a loan application, warranty application, etc.). Therefore, there exists a need for a system which effectively manages creation of cases associated with multiple applications in spite of encountering errors during the process of case creation.

The present system provides a reusable framework for creating cases associated with multiple applications. The framework may be reused by multiple applications within an entity, without having a user to develop a code for each of the applications separately. The present system creates cases associated with multiple applications within an entity effectively even after encountering errors in part because it enables users (or an entity) to track the cases against each externally triggered event. This configuration eliminates the need to (i) perform a different process for each application within an entity and (ii) allocate a resource (e.g., system) specifically for each application within the entity to perform the corresponding process.

In accordance with embodiments of the invention, the terms "resource entity" or "entity" may include any organization that is involved in development of application software. In some embodiments, the resource entity system may be any organization that implements operations or process management application development. In an exemplary embodiment, the resource entity system may be an organization that processes financial transactions including, but not limited to, banks, credit unions, savings and loan associations, card associations, settlement associations, investment companies, stock brokerages, asset management firms, insurance companies and the like. Furthermore, embodiments of the present invention use the term "user" or "customer." It will be appreciated by someone with ordinary skill in the art that the user may be a customer of the financial institution or a potential customer of the financial institution or an employee of the financial institution.

Many of the example embodiments and implementations described herein contemplate interactions engaged in by a user with a computing device and/or one or more communication devices and/or secondary communication devices. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user, second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 illustrates fault tolerant case creation system environment 100, in accordance with embodiments of the invention. As illustrated in FIG. 1, one or more resource entity systems 10 are operatively coupled, via a network 2, to user computer systems 20, an interactive voice response system 30, an email system 40, a fax system 50, a text system 60, and/or one or more other systems (not illustrated). In this way, the user 4 (e.g., one or more associates, employees, agents, contractors, sub-contractors, third-party representatives, or the like), through a user application 27 (e.g., web browser, dedicated or case creation portal, or the like), may access resource entity applications 17 (e.g., website, case creation framework, or the like) of the resource entity systems 10 to track the progress of one or more cases associated with multiple applications. In some embodiments, the case creation framework or application may be a part of an independent case creation system. In such an embodiment, the case creation system is maintained and operated by the resource entity systems 10. The case creation system may comprise one or more processing devices operatively coupled to the one or more memory devices and configured to execute computer readable code stored in the one or more memory devices. In some embodiments, the interactive voice response system 30, the email system 40, the fax system 50, the text system 60 may be a part of the independent case creation system.

In some embodiments, the interactive voice response system 30, the email system 40, the fax system 50, the text system 60 may be a part of the resource entity systems 10. In some embodiments, the interactive voice response system 30, the email system 40, the fax system 50, the text system 60 may be independent systems as shown in FIG. 1. In such embodiments, the resource entity systems 10 maintain or control the interactive voice response system 30, the email system 40, the fax system 50, and the text system 60. The interactive voice response system 30, the email system 40, the fax system 50, the text system 60 may comprise one or more processing devices operatively coupled to the one or more memory devices and configured to execute computer readable code stored in the one or more memory devices.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the resource entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the interactive voice response system 30, the email system 40, the fax system 50, the text system 60 and/or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the resource entity systems 10 comprise computer-readable instructions 18 stored in the memory component 16, which in one embodiment includes the computer-readable instructions 18 of the resource entity application 17 (e.g., website application, case creation framework, or the like). In some embodiments, the one or more memory components 16 include one or more data stores 19 for storing data related to the resource entity systems 10, including, but not limited to, data created, accessed, and/or used by the resource entity application 17.

The smart CICD application may include one or more modules, wherein the one or more modules comprise instructions executable by the one or more processing components 14. The independent interactive voice response system 30, the email system 40, the fax system 50, the text system 60 may include one or more memory components, wherein the one or more memory components may include instructions associated with the case creation framework.

As illustrated in FIG. 1, plurality of users 4 may access the resource entity application 17, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26. The plurality of users may be any employees of the resource entity system. For example, the plurality of users may be application program developers, business analysts, and/or the like. In addition, the system environment 100 may also include user computer systems of one or more end users, wherein the one or more end users access the application software deployed by the system on the user computer systems.

The one or more processing components 24 are operatively coupled to the one or more communication components 22 and the one or more memory components 26. The one or more processing components 24 use the one or more communication components 22 to communicate with the network 2 and other components on the network 2, such as, but not limited to, the other user computer systems, the interactive voice response system 30, the email system 40, the fax system 50, the text system 60, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with a user of the plurality of users 4. In one embodiment of the present invention, the case creation framework in resource entity system 10 may provide a case creation portal in the user computer systems 20 to allow the plurality of users 4 to access information associated with creation of cases.

As illustrated in FIG. 1, the user computer systems 20 may have computer-readable instructions 28 stored in the one or more memory components 26, which in one embodiment includes the computer-readable instructions 28 for user applications 27, such as case creation portal, a web browser or other apps that allow the user to take various actions, including allowing the user to access applications located on other systems, or the like. In some embodiments, the user utilizes the user applications 27, through the user computer systems 20, to access the resource entity applications 17 to access information associated with creation of one or more cases and/or to provide minimal amount of input to the system.

Referring now to FIG. 2A through FIG. 2D, a general process flow 200 is provided for automatically creating cases associated with multiple applications for externally triggered events. Referring to blocks 202 through 214 in FIG. 2A, as shown in block 202, the system receives an application specific input from at least one first user (for example, an employee of the entity such as a developer), via a user portal, associated with at least one first application, wherein the application specific input includes at least case properties, case intake information, and a plurality of predefined triggering parameters. The user portal is the case creation portal provided by the resource entity systems 10 or the independent case creation system in the user computing systems 10. The plurality of users 4 (employees of the entity) within entity may access the user portal simultaneously to provide applications specific inputs associated with multiple applications used within the entity. For each application, the at least one first user may provide case properties, case intake information, and predefined triggering parameters via the user portal. The case properties may comprise at least a number of retries associated with creation of each of the cases, actions to be performed for when a case creation results in an error, or the like. The actions may comprise implementing automatic remediation steps, notifying a user, retrying the case, aborting the case and updating a record associated with the case, capturing error information associated with the case, or the like. The case intake information may comprise one or more details or inputs required for creating the application specific case. For example, for creating a case, the system may require a name, type, value, date stamp, time stamp, additional details, or the like associated with the case. The user may provide the one or more inputs that the system needs to capture for creating the case. The plurality of predefined triggering parameters include selecting one or more triggers from an email received in a mailbox of the email system, a document received via fax by the fax system, an interaction with the interactive voice response system, and a text message received in a message folder of the text system, or the like. As shown in block 204, the system stores the application specific input received from the at least one first user in a repository. For every application, the system stores each of the above mentioned application specific inputs in a separate repository or the memory of the system.

As shown in block 206, in certain embodiments, the system monitors a plurality of external systems for occurrence of one or more triggering events corresponding to at least one of the predefined triggering parameters associated with the at least one first application. The system monitors the interactive voice response system, the fax system, the text system, the email system, social media systems, or the like to monitor one or more external events based on the above mentioned predefined triggering parameters for all applications within an entity. In various embodiments, "use" of the present system is not necessarily limited to customers of the entity or employees (e.g., developer or system operator) of the entity, but rather may be utilized by either customers or employees. In one example, a customer of the entity may send an email to the email system regarding a new loan. The system may identify the email received by the email system and initiate creation of a case associated with the new loan, where the case corresponds with an application (e.g., loan application) used by the entity. In another example, an employee (e.g., system operator) of an entity may send a text message to the text system regarding a warranty claim. The system may identify the text message received by the text system and initiate creation of a warranty case associated with the warranty claim, where the warranty case corresponds with a warranty application used by the entity. In such embodiments, the system may simultaneously monitor multiple systems to identify triggers associated with multiple applications associated with an entity.

As shown in block 208, the system identifies occurrence of the at least one first event associated with the at least one first application (by the above-described monitoring). The system also identifies the type of application associated with each externally triggered event. Information for identifying the type of application may be present in the externally triggered event. For example, the system identifies an external triggering event such as a text message received from a customer for a new loan.

As shown in block 210, the system in response to identifying occurrence of the at least one first event, extracts the case properties and the case intake information associated with the at least one first application from the repository. For example, the system identifies that the external event is associated with a warranty application and may extract case properties and case intake information associated with the warranty application from the repository. The system may perform this step for multiple cases associated with multiple applications simultaneously.

As shown in block 212, the system creates an instance of the at least one external event based on the case intake information. The instance may comprise each of the inputs or parameters defined by the case intake information of the application specific input. For example, the system may identify that for creation of a warranty case, case intake information such as product information, user information, or the like is required. The system may collect all case intake information required to create an application specific case from the externally triggered event.

As shown in block 214, the system adds the at least one first event and the associated instance of the at last one first external event in a queue as a first entry. The system adds the event and the associated instance to the queue and assigns a unique identifier to the event and the associated instance. In some embodiments, the queue may be a temporary storage queue. In some embodiments, the queue may be a permanent storage queue, wherein all records associated with all entries to the queue are stored in the memory.

In one exemplary embodiment of the present invention, the process flow explained in blocks 202 through 214 of FIG. 2A (or any step or combination of the steps discussed with reference to FIG. 2A) may be performed manually. A user (e.g., employee of the entity) may identify one or more external events by monitoring the plurality of external systems. For each of the identified one or more external events, a user (e.g., developer) may provide application specific input based on the type of application the external event is associated with. The application specific input may include case properties and case intake information. The user, based on identifying the one or more external events, can manually create an instance for the external event and add the external event and the associated instance to a queue as a first entry.

Referring now to blocks 216 through 226 in FIG. 2B, as shown in block 216, the system de-queues the first entry. In some embodiments, the system de-queues multiple entries in a queue and process the entries simultaneously. De-queuing is a method of extracting entries of events and associated instances from a queue.

As shown in block 218, the system invokes one or more codes associated with the first external event for creating a first case for the external event and the associated instance, wherein the one or more codes are associated with the at least one first application. There may be one or more codes associated with the process of actual case creation for every application. For example, there may be codes for creating a warranty case associated with a warranty application. The system, based on the type of application, invokes or calls the one or more codes associated with the identified type of application. For example, the system may invoke one or more codes associated with a loan application for creation of a loan case.

As shown in block 220, the system generates a report associated with the creation of the first case. The system generates a report for each of the cases associated with each of the externally triggered events and the report comprises at least a date stamp and time stamp of when the case was identified, when the instance was created, when the instance was placed in a queue, and one or more steps described in the process flow 200 which are associated with the creation of a case. The report also comprises a unique identifier associated with each triggering event and its associated case.

As shown in block 222, the system identifies if the creation of the first case by the one or more codes is successful. The creation of the case after invoking one or more codes may or may not be successful. The one or more codes may throw an error and may not complete the process of creation until the error is resolved. For example, a particular input required by the one or more codes may be missing in the case intake information collected by the system. In an instance where the user (employee of the entity) is performing the steps of monitoring the external systems and creating instances manually, the user (employee of an entity) may not present all case intake information associated with the identified externally triggered event. In another instance, the system is performing the steps of monitoring the external system and creating instances automatically. Thus, the system may not be able to identify all the information from the email required for creating a case. In another example, the one or more codes may include instructions for collecting data from a downstream or upstream application or system and when the downstream application or system is down or not working, the one or more codes may not collect the data required for creating the case, in which case the one or more codes may throw an error. In one embodiment, the system identifies that the creation of the first case by the one or more codes is successful and proceeds to block 238, wherein the system updates the report associated with the creation of the first case. For example, the system identifies that a first warranty case was created successfully and updates a first loan record about the successful creation of the first case. In another embodiment, the system identifies that the creation of the first case by the one or more codes is not successful and proceeds to block 224. After identifying that the creation of first case is not successful, the system also captures information associated with the unsuccessful creation of the first case. The system may capture error information produced by the one or more codes and may include this information in the report associated with the first case.

As shown in block 224, the system identifies a retry count associated with the creation of the first case from the case properties associated with the at least one first application. The user (employee of the entity) may specify in the application specific input that a particular case creation may be retried 'N' number of times. The system identifies this information based on the case properties extracted from the repository in block 210. For example, the developer may specify that creation of loan case has to be retried five number of times in the case where the case was not successfully created the first time. This prevents the system from unnecessarily raising flags or notifying multiple users (employees of the entity) when the creation of a case fails. For example, in the case wherein one or more codes associated with creating a case cannot get data from a downstream system or an upstream system due to network issues, the system instead of aborting the case creation or notifying one or more users (employees of the entity), retries the case creation for every few minutes until the number of retries specified by the user (employee of the entity) are exhausted. The network issue may be resolved within a few minutes and the case creation may be successful when the case creation is retried.

As shown in block 226, the system identifies if the retry count is greater than zero. For example, the system identifies that the retry count specified by the user (employee of the entity) in the application specific input is 'six.' In the case where the retry count is equal to zero, the system proceeds to block 240. The process in block 240 through block 254 is explained below.

Referring to block 228 through 238 in FIG. 2C, as shown in block 228, the system retries the creation of the first case based on identifying that the retry count is greater than zero. The system may invoke the one or more codes again to create the first case. Before invoking, the one or more codes may be active or dormant (on standby) and the system activates the execution of the one or more codes for retrying the case creation process.

As shown in block 230, the system updates a current case creation count associated with the creation of the first case, wherein the updating comprises increasing the current case creation count by one. As this is first retry associated with the case creation, the current case creation count value before this step is zero. After retrying the system updates the current case creation count associated with the first case to one and the value of the current case creation count is updated in the report associated with the first case.

As shown in block 232, the system identifies if the retry is successful. If the retry is successful, the proceeds to block 238, wherein the report associated with the creation of the first case is updated with information associated with the successful case creation and ends the process. In one embodiment, where the retry is not successful, the system proceeds to block 234. After the unsuccessful retry, the system may update the report associated with the first case and may include the current case creation count number. The system may also capture error information produced by the one or more codes and may include this information in the report associated with the first case.

As shown on block 234, the system determines if the current case count is less than the retry count. In one embodiment, when the system identifies that the current case count is less than the retry count, the system proceeds to block 236. As shown in block 236, the system retries the creation of the first case based on identifying that the current case count is less than the retry count and the system then proceeds to block 230 and implements the process in block 230 through block 236 until the system determines that the current case count is not less than the retry count.

In one embodiment, when the system identifies that the current case count is not less than the retry count, the system proceeds to block 240 of FIG. 2D. As shown in block in block 240, the system updates the report associated with the creation of the first case. The system may also capture error information produced by the one or more codes and may include this information in the report associated with the first case.

As shown in block in block 242, the system notifies the at least one user (employee of the entity) and display the report associated with the creation of the first case. The system may notify one or more users (employees of the entity) who are assigned to a particular application. This information may be provided by the at least one user while providing application specific input to the system in block 202. The system may notify the user and display the report via the user portal. In some embodiments the system may also notify the one or more users by causing the text system to send a message to the one or more users, by causing the interactive voice response system to call the one or more users and provide a notification regarding the failure of creation of first case, or by causing the email system to send emails to the one or more users, or by causing the fax system to deliver a document associated with the failure of creation of the first case to the one or more users. After receiving the notification, the one or more users may log into the user portal to view the report associated with the creation of the first case.

As shown in block in block 244, the system receives one or more remediation steps associated with the creation of the first case from the at least one user (e.g., developer). The remediation steps are one or more processes associated with resolving the error encountered while creating the first case. For example, when the error is associated with any missing input in the case intake information, the user may provide that input to the system. The system upon receiving the missing input from the user, may retry creating the first case automatically. As shown in block in block 246, the system receives an input from the at least one user to retry the creation of the first case, via the user portal. As shown in block in block 248, the system retries the creation of the first case based on receiving the input from the at least one user. In some cases, the system retries the creation of the first case only after receiving an input from the user to retry the case. In some cases, the system automatically retries the creation of the first case after receiving the one or more remediation steps in block 244.

In some embodiments, the system may check records associated the same type of application which have similar error information. The system may then extract remediation steps previously performed by the system to resolve the same type of error and may implement the remediation steps without user input. The system after implementing the remediation steps automatically, may retry the creation of the first case. In some embodiments, the system may implement remediation steps automatically only after receiving an approval from the one or more users (employees of the entity).

As shown, the process proceeds to block 250, where the system identifies if the creation of the case is successful. In one embodiment, when the system identifies that the case creation is successful, the system proceeds to block 252. As shown in block in block 252, the system updates the report associated with the creation of the first case. The system may include information associated with the current case creation count, retry count, remediation steps implemented by the system, or the like in the system.

In another embodiment, the system identifies that the case creation is not successful and proceeds to block 242 where the system notifies the at least one user again. The system repeats the process in blocks 242 through block 252 until the system determines that the creation of the case is successful in block 250. Therefore, the current system follows through on each and every case associated with all identified externally triggered events until each of the cases are created successfully. The system may also create an overall report for every day, week, month, and year, wherein the overall report comprises statistics associated with the number of externally triggered event identifies by the system, number of instances created and placed in the queue, number of cases successfully created for each application, average number of notifications sent to the one or more users before successfully creating cases, number of average retries used by the system to create cases, or the like.

Referring to FIG. 3, a block diagram 300 for illustrating multiple blocks in a fault tolerant case creation framework. The requests agent 310 of the case creation framework identifies external events 305 for multiple applications used within an entity simultaneously and creates instances of each of the identified external events 305 by identifying and capturing case intake information associated with each of the identified external events and saves the instances associated with each of the identified external events in a queue 320. The process agent 330 of the case creation framework reads one or more instances from the queue starts the case creation process 340. The process agent 330 may read multiple instances from the queue simultaneously and starts the case creation process of all read instances simultaneously. The case creation framework may present the reports associated with each of the cases via the case creation portal 350.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for fault tolerant case creation, the system comprising:
   one or more memory devices having computer readable code stored thereon;
   one or more processing devices operatively coupled to the one or more memory devices, wherein the one or more processing devices are configured to execute the computer readable code to:
   receive an application specific input from at least one first user, via a user portal, associated with at least one first application, wherein the application specific input comprises at least case properties, case intake information, and a plurality of predefined triggering parameters, each of which indicates a need for a case to be created;
   store the application specific input received from the at least one first user in a repository;
   access the repository to determine at least one of the plurality of predefined triggering parameters;
   identify occurrence of at least one first event associated with the at least one first application;
   in response to identifying occurrence of the at least one first event, extract the case properties and the case intake information associated with the at least one first application from the repository;
   create an instance of the at least one first event based on the case intake information;
   add the at least one first event and the associated instance of the at least one first event in a queue as a first entry;
   de-queue the first entry; and
   invoke one or more codes associated with the first event for creating a first case for the first event and the associated instance, wherein the one or more codes are associated with the at least one first application.

2. The system of claim 1, wherein the one or more processing devices are configured to execute the computer readable code to:
   identify that the creation of the first case by the one or more codes is successful; and
   generate a report comprising information associated with the successful creation of the first case.

3. The system of claim 1, wherein the one or more processing devices are configured to execute the computer readable code to:
   identify that the creation of the first case by the one or more codes is not successful;
   identify a retry count associated with the creation of the first case from the case properties associated with the at least one first application;
   identify that the retry count is greater than zero;
   retry the creation of the first case based on identifying that the retry count is greater than zero;
   update a current case creation count associated with the creation of the first case, wherein the updating comprises increasing the current case creation count by one; and
   generate a report associated with the creation of the first case, wherein the report comprises at least the retry count and the current case creation count.

4. The system of claim 3, wherein the one or more processing devices are configured to execute the computer readable code to:
   in response to retrying the creation of the first case, identify that the retry is not successful;
   determine that the current case creation count is less than or equal to the retry count;
   retry the creation of the first case based on determining that the current case creation count is less than the retry count; and
   update the current case creation count in the report.

5. The system of claim 3, wherein the one or more processing devices are configured to execute the computer readable code to:
   identify that the retry in not successful;
   determine that the current case creation count is more than the retry count; and
   notify the at least one first user and display the report to the at least one first user via the user portal.

6. The system of claim 5, wherein the one or more processing devices are configured to execute the computer readable code to receive one or more remediation steps from the at least one first user, wherein the one or more remediation steps are associated with the creation of the first case.

7. The system of claim 5, wherein the one or more processing devices are configured to execute the computer readable code to:
   in response to notifying the at least one first user, receive an input from the at least one first user to retry the creation of the first case; and
   retry the creation of the first case based on receiving the input from the at least one first user.

8. The system of claim 3, wherein the one or more processing devices are configured to execute the computer readable code to:
   in response to identifying that the creation of the first case is not successful, identify error information associated with the creation of the first case; and
   update the report with the identified error information.

9. The system of claim 3, wherein the one or more processing devices are configured to execute the computer readable code to identify that that the creation of the first case by the one or more codes is not successful by at least
  determining that the instance with the first case intake information does not comprise all inputs for the case intake information associated with the application specific input.

10. The system of claim 3, wherein the one or more processing devices are configured to execute the computer readable code to:
  identify that the retry count is equal to zero; and
  notify the at least one user and display the report to the at least one user via the user portal.

11. The system of claim 1, wherein the one or more processing devices are configured to execute the computer readable code to identify occurrence of the at least one first event by identifying a trigger based on at least one of an email received in a mail box, a document received via fax, an interaction with an interactive voice response system, and a text message received in a message folder.

12. The system of claim 1, wherein the one or more processing devices are configured to execute the computer readable code to:
  identify occurrence of a second external event associated with a second application;
  in response to identifying occurrence of the second external event, extract the case properties and the case intake information associated with the second external event from the repository;
  create a second instance of the second external event based on the case intake information;
  add the second external event and the associated second instance of the second external event in the queue as a second entry;
  de-queue the second entry; and
  invoke second set of one or more codes associated with the second external event for creating a second case for the second external event and the associated second instance, wherein the second set of one or more codes are associated with the second application.

13. The system of claim 1, wherein identifying occurrence of the at least one first event comprises receiving an internal event input from the at least one first user associated with an external triggering event.

14. The system of claim 1, wherein identifying occurrence of the at least one first event comprises monitoring a plurality of external systems for occurrence of one or more triggering events corresponding to at least one of the predefined triggering parameters associated with at least one first application;
  wherein identifying comprises identifying, by the monitoring, occurrence of at least one first event associated with the at least one first application.

15. A computer program product for fault tolerant case creation, the computer program product comprising at least one non-transitory computer-readable medium having computer-readable program code portions embodied therein, the computer-readable program code portions comprises one or more executable portions for:
  receiving an application specific input from at least one first user, via a user portal, associated with at least one first application, wherein the application specific input comprises at least case properties, case intake information, and a plurality of predefined triggering parameters, each of which indicates a need for a case to be created;
  storing the application specific input received from the at least one first user in a repository;
  accessing the repository to determine at least one of the plurality of predefined triggering parameters;
  identifying occurrence of at least one first event associated with the at least one first application;
  in response to identifying occurrence of the at least one first event, extracting the case properties and the case intake information associated with the at least one first application from the repository;
  creating an instance of the at least one first event based on the case intake information;
  adding the at least one first event and the associated instance of the at least one first event in a queue as a first entry;
  de-queuing the first entry; and
  invoking one or more codes associated with the first event for creating a first case for the first event and the associated instance, wherein the one or more codes are associated with the at least one first application.

16. The computer program product of claim 15, wherein the computer-readable program code portions comprises one or more executable portions for:
  identifying that the creation of the first case by the one or more codes is successful; and
  generating a report comprising information associated with the successful creation of the first case.

17. The computer program product of claim 15, wherein the computer-readable program code portions comprises one or more executable portions for:
  identifying that the creation of the first case by the one or more codes is not successful;
  identifying a retry count associated with the creation of the first case from the case properties associated with the at least one first application;
  identifying that the retry count is greater than zero;
  retrying the creation of the first case based on identifying that the retry count is greater than zero;
  updating a current case creation count associated with the creation of the first case, wherein the updating comprises increasing the current case creation count by one; and
  generating a report associated with the creation of the first case, wherein the report comprises at least the retry count and the current case creation count.

18. The computer program product of claim 17, wherein the computer-readable program code portions comprises one or more executable portions in response to retrying the creation of the first case, identifying that the retry is not successful;
  determining that the current case creation count is less than or equal to the retry count;
  retrying the creation of the first case based on determining that the current case creation count is less than the retry count; and
  updating the current case creation count in the report.

19. The computer program product of claim 17, wherein the computer-readable program code portions comprises one or more executable portions identifying that the retry in not successful;
  determining that the current case creation count is more than the retry count; and
  notifying the at least one first user and displaying the report to the at least one first user via the user portal.

20. A computer implemented method for fault tolerant case creation, the method comprises:
  receiving an application specific input from at least one first user, via a user portal, associated with at least one first application, wherein the application specific input comprises at least case properties, case intake information, and a plurality of predefined triggering parameters, each of which indicates a need for a case to be created;

storing the application specific input received from the at least one first user in a repository;

accessing the repository to determine at least one of the plurality of predefined triggering parameters;

identifying occurrence of at least one first event associated with the at least one first application;

in response to identifying occurrence of the at least one first event, extracting the case properties and the case intake information associated with the at least one first application from the repository;

creating an instance of the at least one first event based on the case intake information;

adding the at least one first event and the associated instance of the at least one first event in a queue as a first entry;

de-queuing the first entry; and invoking one or more codes associated with the first event for creating a first case for the first event and the associated instance, wherein the one or more codes are associated with the at least one first application.

* * * * *